(12) United States Patent
Savage et al.

(10) Patent No.: US 6,595,309 B1
(45) Date of Patent: Jul. 22, 2003

(54) SNOWMOBILE SUSPENSION

(75) Inventors: William M. Savage, Bonsal, CA (US); Kent H. Harle, La Jolla, CA (US)

(73) Assignee: Redline Performance Products, Inc., Vista, CA (US)

( * ) Notice: Subject to any disclaimer, the term of this patent is extended or adjusted under 35 U.S.C. 154(b) by 0 days.

(21) Appl. No.: 09/502,280

(22) Filed: Feb. 10, 2000

Related U.S. Application Data

(63) Continuation-in-part of application No. 09/268,264, filed on Mar. 15, 1999, now Pat. No. 6,263,991.

(51) Int. Cl.[7] .............................................. B62M 29/00
(52) U.S. Cl. ..................... 180/190; 180/193; 180/9.52
(58) Field of Search ................... 180/193, 9.5, 9.54, 180/9.56, 9.25, 190, 184, 9.52; 188/266.1, 266.6; 280/284

(56) References Cited

U.S. PATENT DOCUMENTS

| | | | | |
|---|---|---|---|---|
| 2,519,974 A | * | 8/1950 | Mork | 180/9.5 |
| 3,727,709 A | * | 4/1973 | Newman | 180/9.5 |
| 4,093,033 A | * | 6/1978 | Rosch | 180/9.56 |
| 4,518,056 A | * | 5/1985 | Kobayashi | 180/193 |
| 4,881,609 A | * | 11/1989 | Purcell et al. | 180/9.5 |
| 5,265,692 A | * | 11/1993 | Mallette | 180/193 |
| 5,791,429 A | * | 8/1998 | Bergman | 180/193 |
| 5,829,545 A | * | 11/1998 | Yamamoto et al. | 180/190 |
| 5,881,834 A | * | 3/1999 | Karpik | 180/193 |
| 5,904,217 A | * | 5/1999 | Yamamoto et al. | 180/190 |
| 5,924,528 A | * | 7/1999 | Vermolen et al. | 188/266.1 |
| 5,944,134 A | * | 8/1999 | Peppel et al. | 180/193 |
| 5,947,220 A | * | 9/1999 | Oka et al. | 180/193 |
| 6,206,124 B1 | * | 3/2001 | Mallette et al. | 180/193 |
| 6,234,264 B1 | * | 5/2001 | Boivin et al. | 180/193 |

* cited by examiner

*Primary Examiner*—Brian L. Johnson
*Assistant Examiner*—Hau Phan
(74) *Attorney, Agent, or Firm*—Luce, Forward, Hamilton & Scripps LLP

(57) ABSTRACT

An extended movement rear suspension for a snowmobile. The suspension includes at least two elongated members of a substantially constant length coupled to the snowmobile frame and to an endless track guide rail assembly. The suspension configures the endless track into a generally triangular shape.

8 Claims, 14 Drawing Sheets

SNOWMOBILE SUSPENSION

REFERENCE TO RELATED APPLICATION

This is a continuation-in-part of application Ser. No. 09/268,264 filed Mar. 15, 1999 now U.S. Pat. No. 6,263,991, entitled SNOWMOBILE.

BACKGROUND OF THE INVENTION

1. Field of the Invention

The present invention generally relates to snowmobiles. More particularly, the invention relates to rear suspension systems for snowmobiles.

2. Discussion of the Related Art

Snowmobiles are generally used to travel over terrain covered with snow. As shown in FIG. 1, a conventional snowmobile has several major components: a front suspension 1 with skis that are connected to a steering mechanism 2; a main body 3, including a frame which houses an engine that drives a continuous belt or track 4; a tunnel 5 that covers the upper portion of the track; and a seat 6 for an operator. A rear suspension assembly 7 is located within the area encompassed by the track.

Flexible track vehicles, such as snowmobiles, present unique suspension problems. A suspension should provide driving comfort and operating safety by absorbing uneven terrain features—this requires the suspension to have a large range of motion, or travel. In an automobile the suspension assembly allows the tire to pivot upwards and downwards, permitting a large amount of travel. In contrast, the suspension assembly for a tracked vehicle anchors the track and only allows the track perimeter to compress and expand, without any pivoting motion of the track as a whole, thus limiting suspension travel, as shown in FIG. 2.

For example, prior art suspension assemblies, as shown in FIGS. 2 and 3, are designed to guide the track perimeter into a generally parallelogram shape. An upper track routing 8, housed within the tunnel 5, is defined by a drive sprocket 11, and a set of idler wheels 12. A lower track routing 9 is defined by another set of idler wheels 12, and a pair of slide rails 13. Springs 14 prevent the track from collapsing and shock absorbers 15 dampen the springs' oscillations. Various arms 16 connect the slide rails to the tunnel.

When a snowmobile encounters a bump, the lower track routing moves upwards and the track compresses, but the upper track routing remains fixed relative to the frame 3 in the tunnel 5, as shown in FIG. 2. Once over the bump, the track perimeter expands as the lower track routing resumes its previous position relative to the frame and upper track routing. However, the compression and expansion of the track perimeter is limited because the upper and lower track routings have a substantially fixed length. Therefore, the only sections of the track that can vary in length, permitting suspension travel, are the "side" track routings 10 that connect the upper and lower track routings. This limits the total amount of suspension travel to about 10 inches. Because of this limited suspension travel, a significant amount of the force exerted by bumps is absorbed by the frame 3 and the operator, which can adversely affect operator comfort and vehicle handling.

Prior art suspensions have employed a variety of devices and concepts in a generally unsuccessful effort to keep the limited travel suspension from compressing completely. This is known as "bottoming." Stiffer springs that require more compression force can be used, but this degrades operator comfort when traversing relatively smooth terrain as the springs do not deflect, or compress in response to smaller bumps. Stiffer springs are also heavy and more expensive.

Another way to keep the suspension from bottoming is to increase the suspension's stiffness as it is compressed, a "rising-rate" suspension. Put differently, as the suspension is compressed, an increasing amount of force is required to compress it further. Generally, two techniques are currently used to achieve a rising-rate suspension: 1) specially-designed springs; and 2) sophisticated linkage arrangements that pivotally connect the suspension arms to the springs. Under either technique, the components are heavy and expensive. Furthermore, with the sophisticated linkage arrangements of technique (2), each pivot point experiences high forces that can cause binding, making the overall system even more stiff, and less able to follow the terrain.

Complex linkage arrangements are also used to overcome shortcomings associated with existing "suspension geometry." The "geometry" of a suspension is defined by the arrangement of the lengths and pivot points of the arms, links and other suspension components. For example, the slide rails' 13 movement is controlled by the suspension arms 16 pivoting about their attachment points on the snowmobile frame.

Another shortcoming of conventional suspension assemblies is the difficulty associated with weight transfer. Weight can be transferred from the front of the track (that is, the portion of the track closest to the skis) to the rear of the track (that is, the portion of the track farthest from the skis) by adjusting the slide rails. A slight upward incline, or angle of the track shifts the weight to the rear of the track, and a slight downward angle of the track shifts the weight to the front of the track. This changes the amount of weight carried by the front suspension and steering skis. When operating on ice, it is preferable to transfer more weight onto the skis, which helps them to "bite" the ice for better control. When driving on lightly packed snow, less weight on the skis and front suspension helps the skis to ride on top of the snow. Snow conditions may change frequently, but adjusting weight transfer on conventional suspension assemblies is somewhat difficult. Therefore, operators may not always bother to optimize the weight transfer.

It is also difficult to adjust the springs and shocks on conventional suspension assemblies. Because they are located within the track, and the track becomes filled with snow during operation, adjusting the springs or shock absorbers requires laying down in the snow and removing all the snow that has accumulated around them.

SUMMARY OF THE INVENTION

The present invention addresses the problem of insufficient rear suspension travel on tracked vehicles. In some embodiments, the present invention provides a way to mount an endless track to a snowmobile in a generally triangular configuration.

More specifically, one embodiment of the invention mounts an endless track for a snowmobile around only three contact areas. As used herein, the term contact area means a portion of a track guide that guides the track to change direction. In most snowmobiles, the contact areas are rotating wheels and track sprockets, and the track runs around a portion of the rotating wheels and sprockets and maintains a generally rolling contact therewith. In one embodiment of the present invention, the endless track only changes direction about the three track contact areas to form a generally triangular shape.

In addition, some embodiments of the present invention address the problem of cold seats on snowmobiles by routing at least a segment of the engine exhaust pipe under the seat. The exhaust pipe carries relatively warm exhaust and serves to warm the seat and thus the operator.

However, the claims alone—not the preceding summary—define the invention.

BRIEF DESCRIPTION OF THE DRAWINGS

The nature, goals, and advantages of the invention will become more apparent to those skilled in the art after considering the following detailed description when read in connection with the accompanying drawing—illustrating by way of examples the principles of the invention—in which like reference numerals identify like elements throughout, wherein.

DETAILED DESCRIPTION OF THE PREFERRED EMBODIMENTS

General

Figure 4:
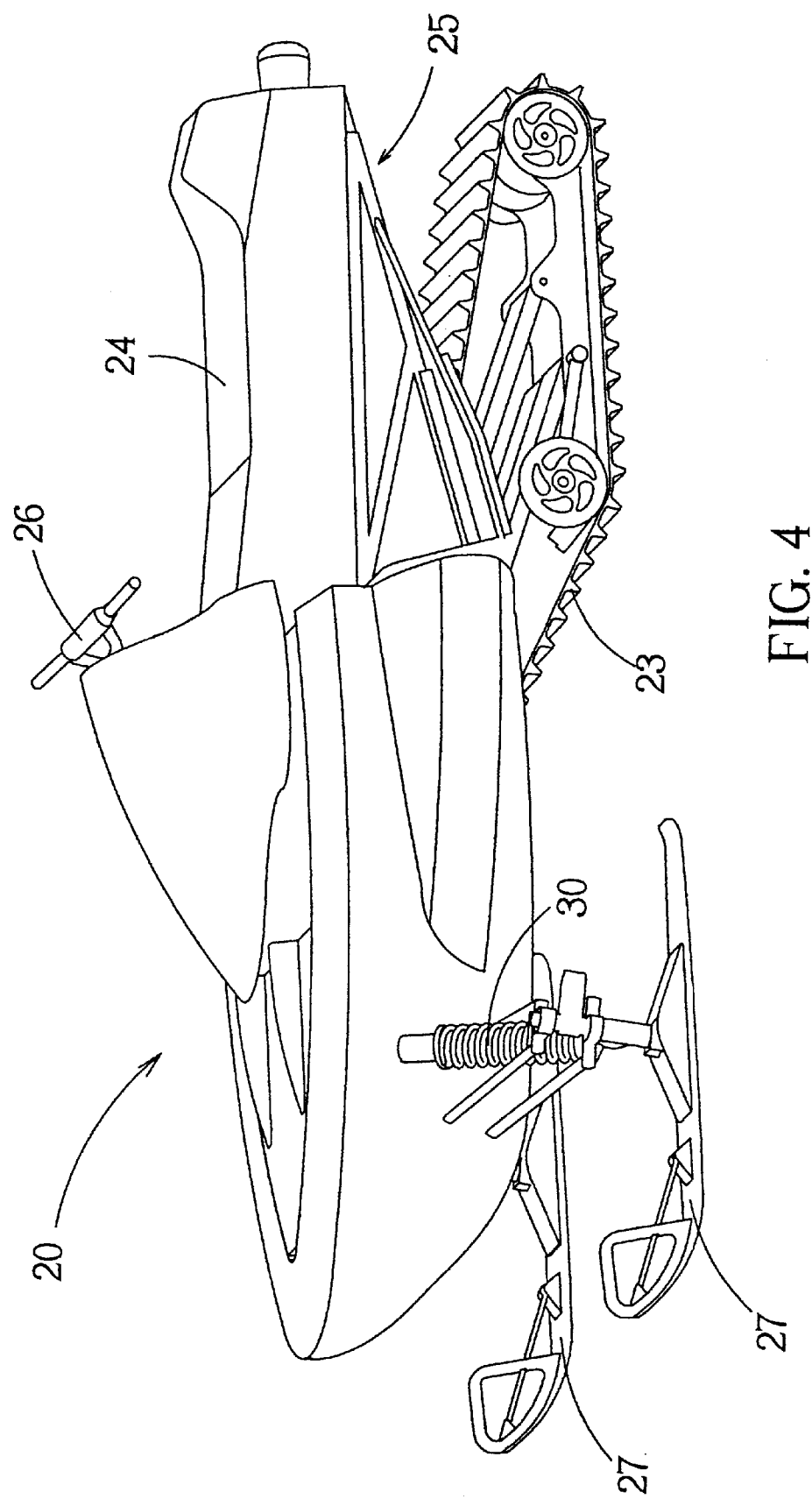
FIG. 4 is a perspective view of one embodiment of the snowmobile of the present invention.

As shown in FIG. 4, a snowmobile according to the invention provides an extended movement rear suspension by configuring the endless track or belt into a substantially triangular shape.

Figure 2:
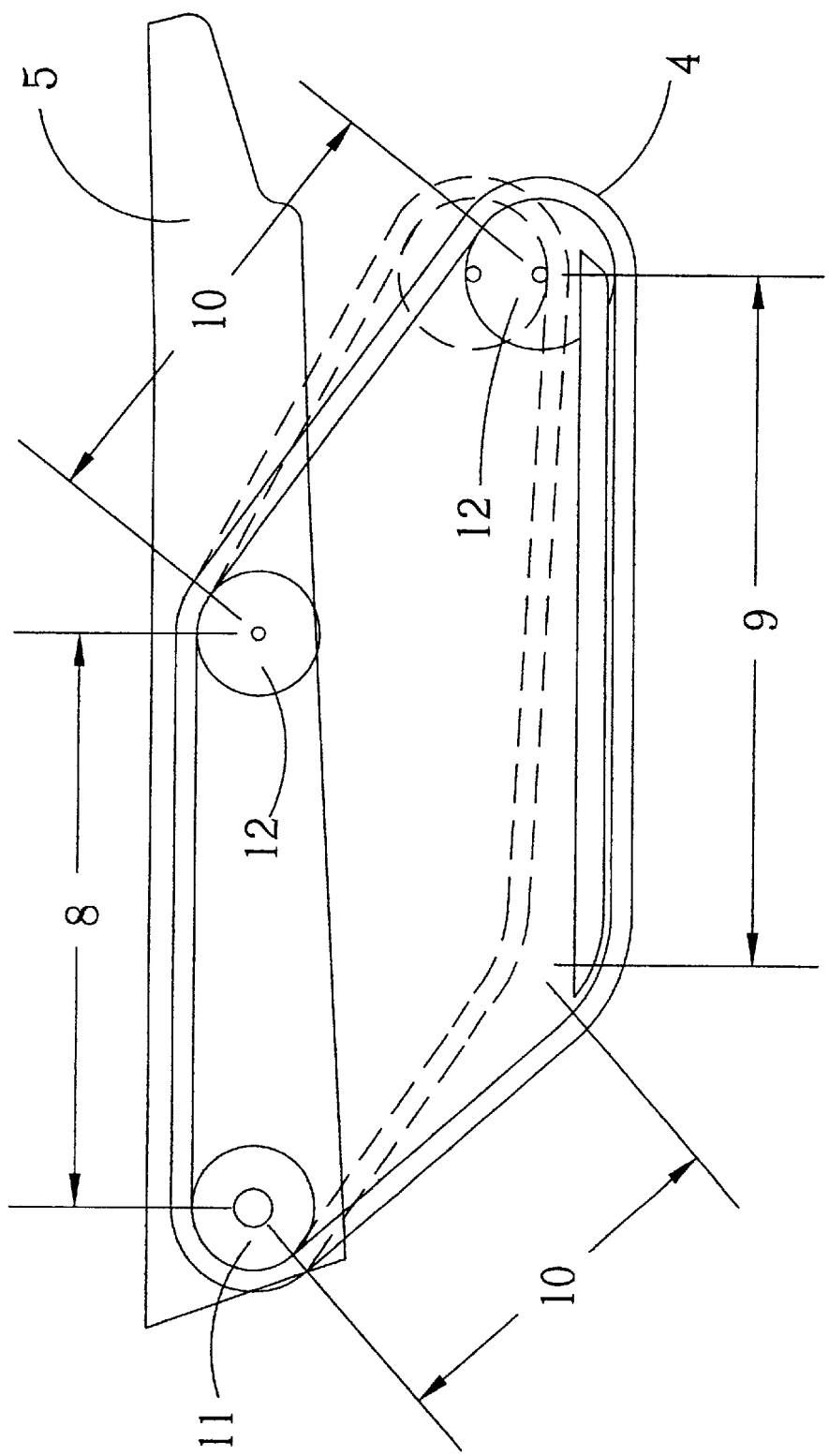
FIG. 2 is a side elevation view of the movement of a prior art snowmobile rear suspension.
Figure 3:
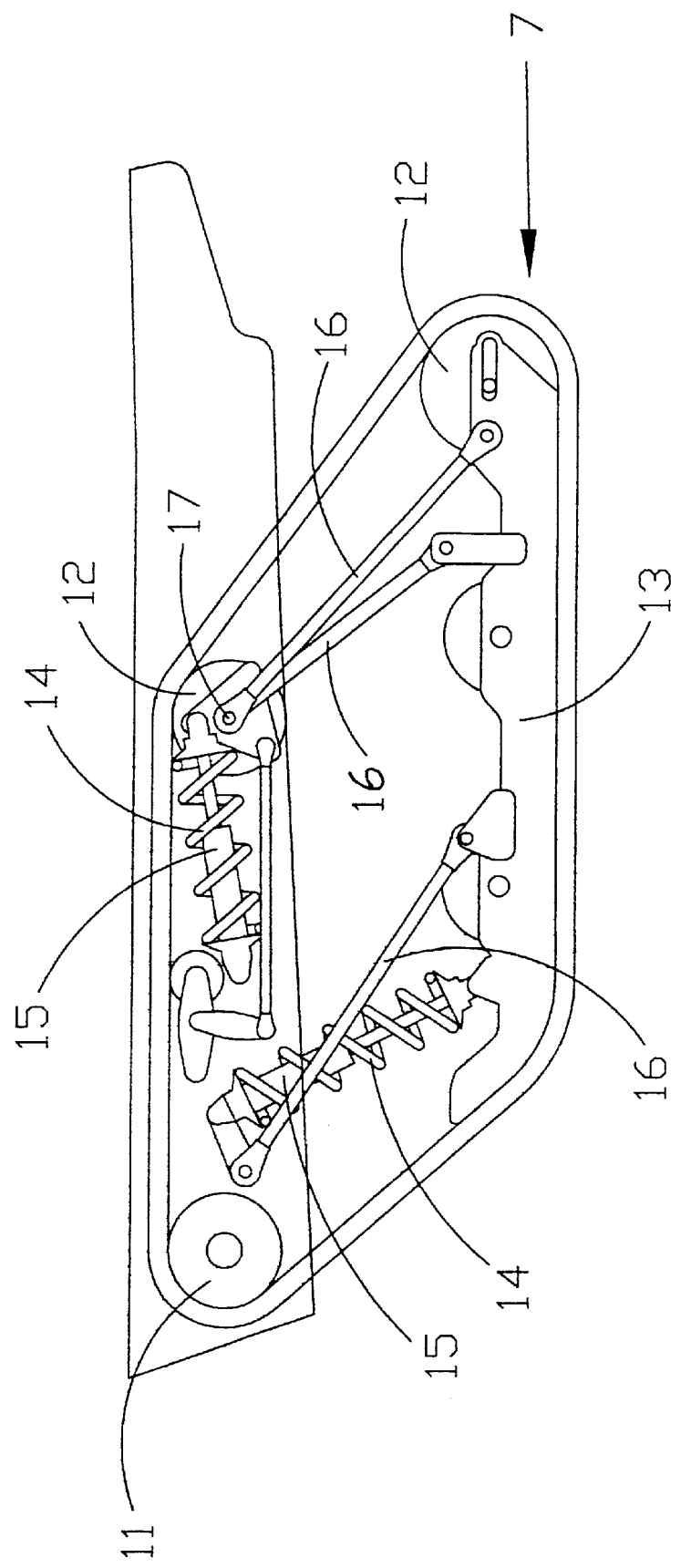
FIG. 3 is a side elevation view of a prior art snowmobile rear suspension.

Conventional snowmobiles have an extended upper track routing that configures the track into a parallelogram shape, as shown in FIG. 3. The length of the upper track routing, combined with a substantial lower track routing, necessary for supporting the snowmobile on the snow, leaves little track available for suspension travel. Conventional snowmobiles use incredibly complex linkage assemblies in an attempt to overcome the inherent shortcomings associated with mounting the entire suspension inside the track, which limits the track movement to compression and expansion of the upper track routing 8 relative to the lower track routing 9, as shown in FIG. 2.

A rear suspension for a tracked vehicle according to the invention provides a large amount of suspension travel by configuring the track into a triangle, thus "freeing-up" more of the track for suspension movement. The triangular configuration also allows the track as a whole to pivot, thus further increasing available suspension travel.

The rear suspension is light, simple and easily fabricated. Moreover, access to the spring and shock absorber is improved, and the rising-rate suspension geometry is optimized to achieve superior driving comfort and operating safety. Furthermore, an advantageously large leverage ratio between suspension components is obtained.

Structure

Figure 5:
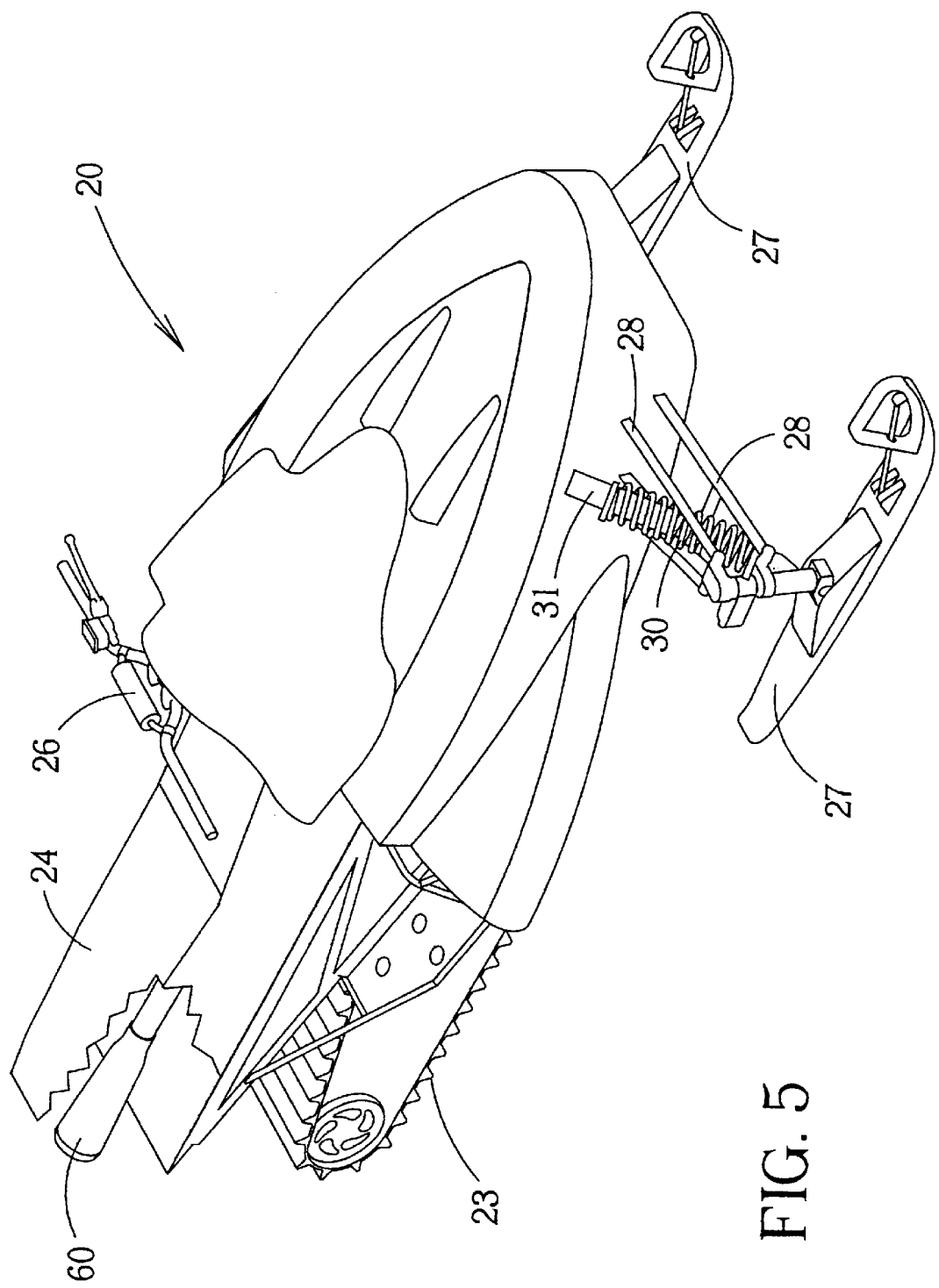
FIG. 5 is a perspective view of the embodiment of FIG. 4, illustrating the engine exhaust pipe routing.
Figure 6:
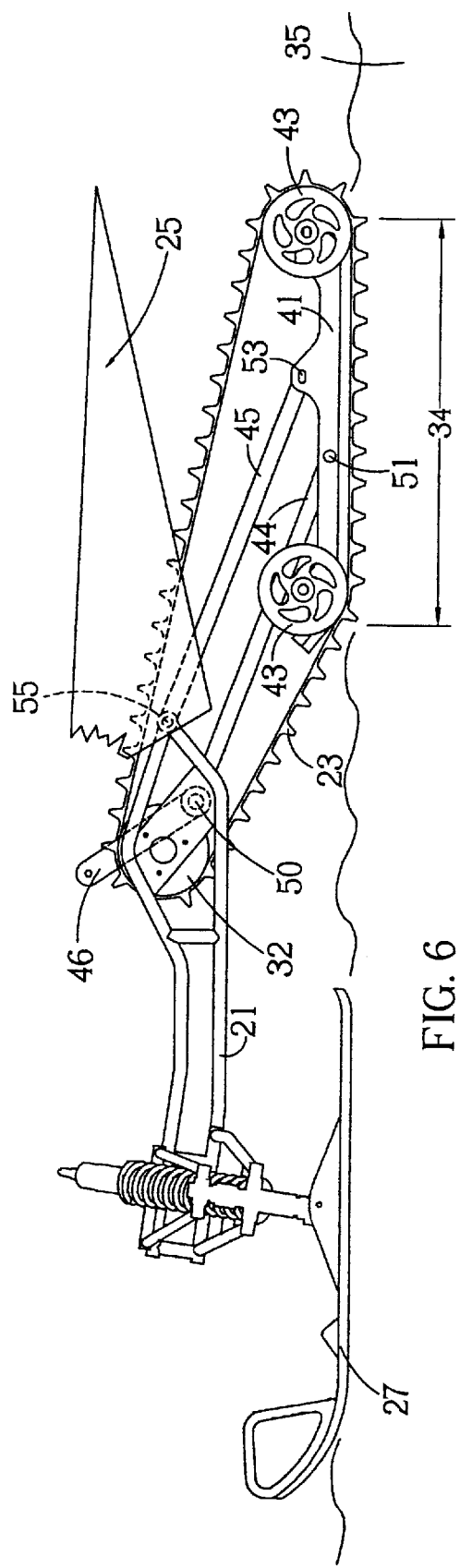
FIG. 6 is a side elevation view of the embodiment of FIG. 4, illustrating specific components.

Referring to FIGS. 4–6, a snowmobile in accordance with one embodiment of the invention is illustrated and designated generally by the numeral 20. A frame or chassis 21 mounts an engine (not shown) that drives an endless track or belt 23. When positioned on the seat 24 that is located over a tunnel 25, a operator steers the snowmobile by a handlebar assembly 26 that communicates with a front suspension having skis 27 pivotally mounted to the frame by conventional arms 28. Front springs 30 and shock absorbers or dampers 31 support the front suspension.

Figure 7:
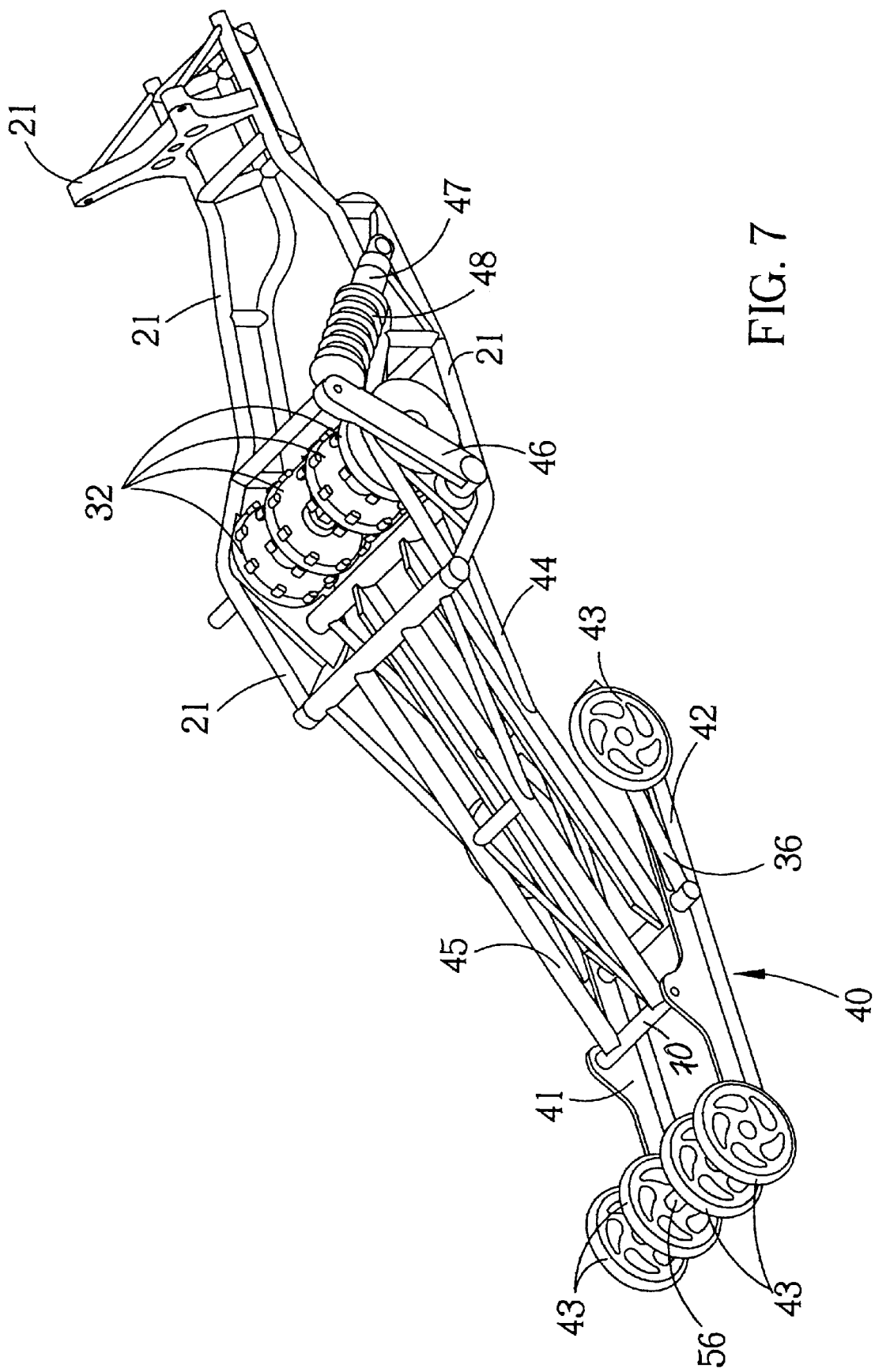
FIG. 7 is a perspective view of the frame, track sprockets and rear suspension components of the embodiment of FIG. 4.
Figure 8:
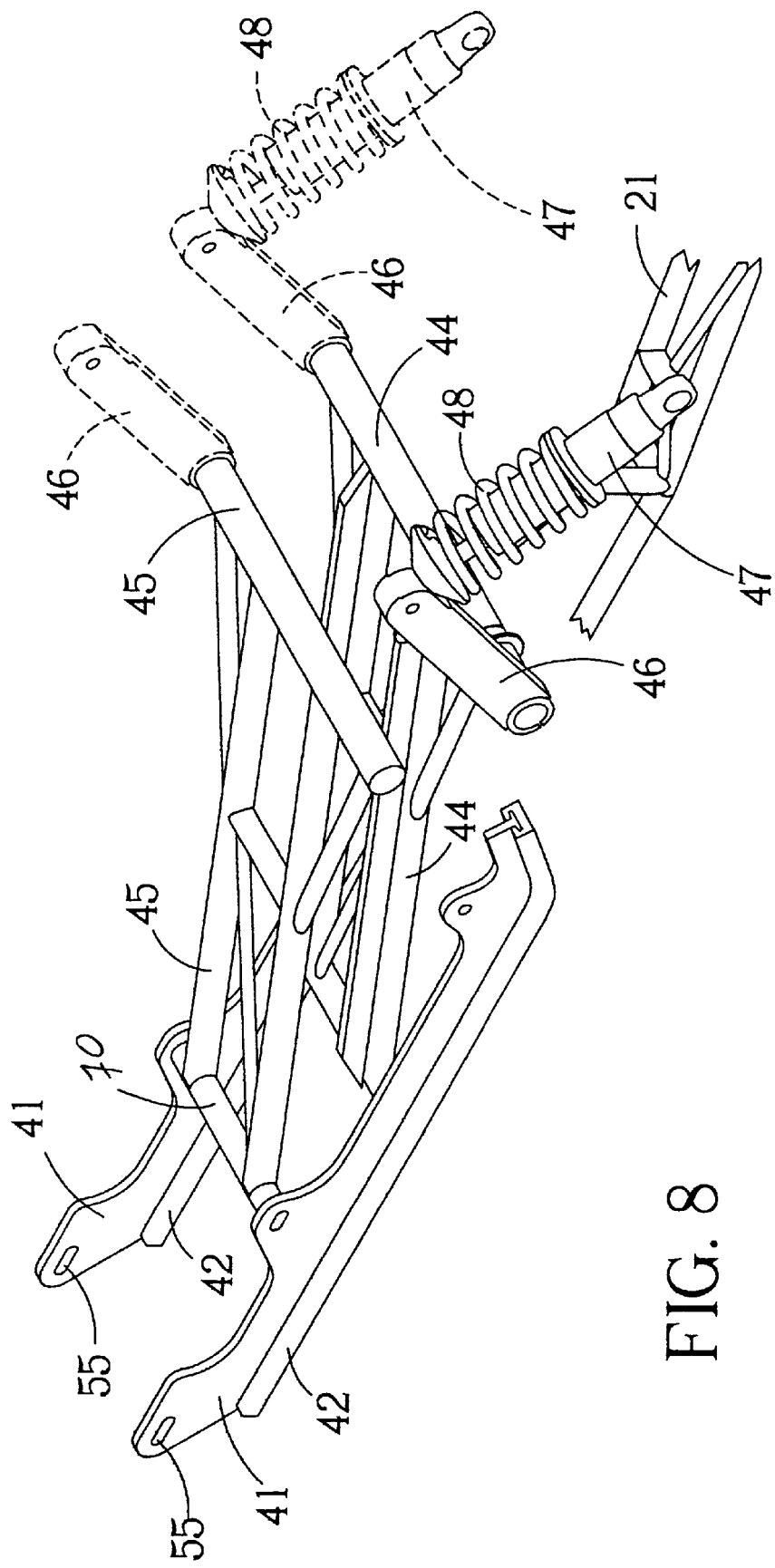
FIG. 8 is a perspective view of specific rear suspension components of the embodiment of FIG. 7.

Referring to FIGS. 6–8, the engine 22 has a drive chain or other conventional system (not shown) that transmits engine power to a plurality of track sprockets or drive wheels 32. A conventional track sprocket arrangement is preferred, with the individual track sprockets having a diameter of about seven (7) inches. Preferably, the engine is a 4-stroke type, but 2-stroke engines can also be used. The track sprockets define an upper track routing, or a rolling contact area on the inner surface of the track 23 that is positioned about, and supported by, various rear suspension components. A lower guide assembly, or lower track routing 40 has two slide rails 41 with track guides or sliders 42 that directly contact the track 23 and are made of a suitable low-friction material. Rotatably connected at the forward and aft areas of the slide rails are conventional idler wheels or track support wheels 43 that provide a lower rolling contact area for the track. An idler wheel support or brace 36 is mounted to the slide rail 41 at the front slide rail pivot point 51 and about the idler wheel 43 axle. The brace resists bending forces exerted against the idler wheel by the track 23.

As shown in FIG. 6, the track 23 is positioned between the ground or terrain 35, sliders 42, and idler wheels 43. The track terrain contact area 34 is that portion or section of track that contacts the ground when the snowmobile is stationary and positioned on substantially flat, level ground with no operators or objects placed on it. This is known as ride height, or design height.

A front or forward suspension member or arm 44 pivotally joins the slide rails 41 to the frame 21. A rear or aft suspension member or arm 45 also pivotally joins the slide rails to the frame. The front and rear arms are preferably constructed from high-tensile strength metal tubing, but alternatives such as aluminum alloys, graphite or any other suitable material may be used. As shown in the preferred embodiment of FIGS. 7 and 8, both arms have a general 'H' configuration, with the front and rear arms being equal in length and parallel to each other. Alternatively, the front and rear arms could be unequal in length and not parallel to each other.

A bell crank or rocker arm 46 is preferably mounted to the front arm 44 by a splined, clamped, bolted or other rigid, yet removable method. In other embodiments, the rocker arm could be fastened to the rear arm 45, or two rocker arms could be fastened to one or both of the suspension arms, as shown in phantom lines in FIG. 8.

Figure 1:
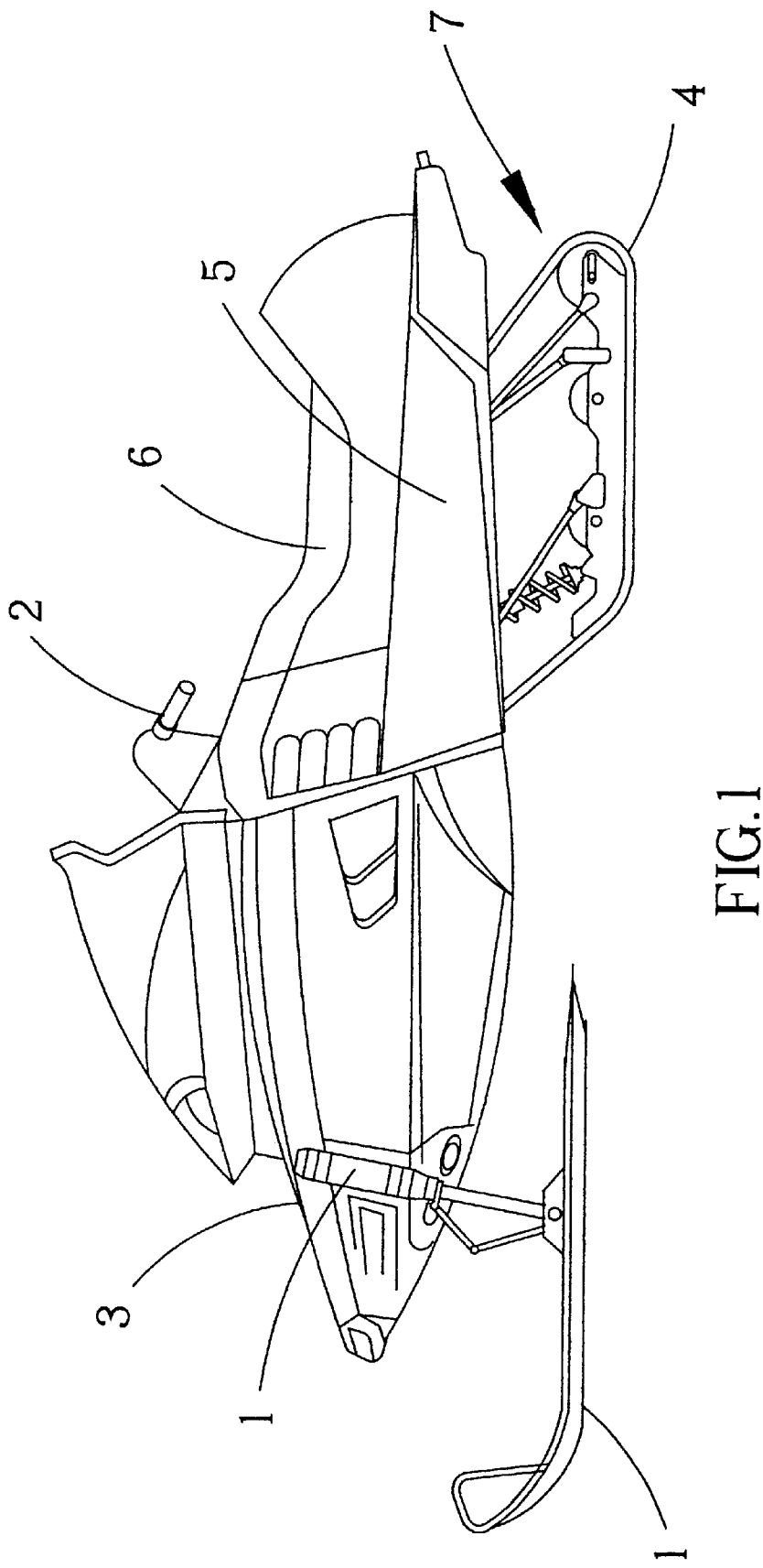
FIG. 1 is a side elevation view of a prior art snowmobile.

Referring to FIGS. 7 and 8, a shock absorber or damper 47 is pivotally connected to the rocker arm 46 and the frame 21. In a preferred embodiment, a coil spring 48 is mounted coaxially with the damper, and the damper has adjustable damping features. However, in other embodiments, a torsion bar, leaf spring, air spring or any other suitable biasing and damping means could be employed. By locating the damper 47 and coil spring 48 next to the engine, adjustments can be performed quickly and easily. In contrast, conventional spring and damper locations inside the track, as shown in FIGS. 1 and 3, require the operator lay down in the snow, and remove snow from around the spring/dampers prior to making adjustments.

Figure 9:
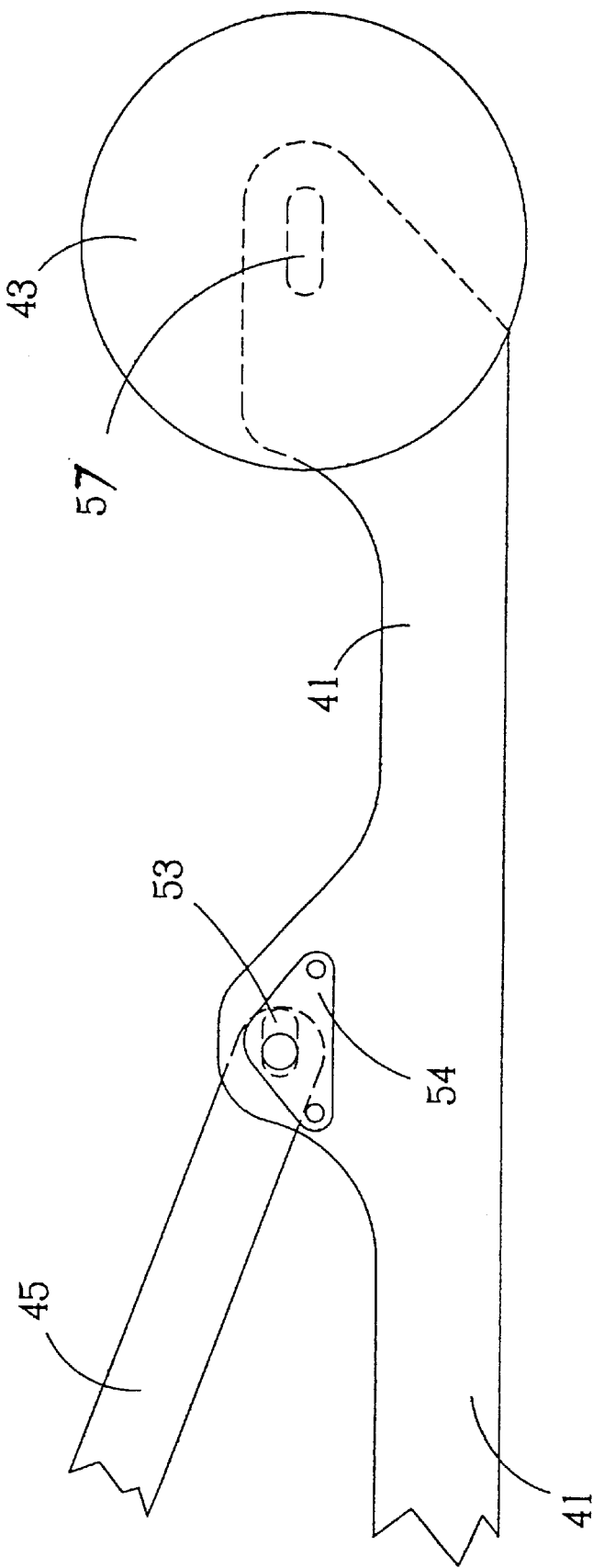
FIG. 9 is a side elevation view of a slide rail section and a rear suspension arm of the embodiment of FIG. 7.

Referring to FIG. 9, the rear suspension arm 45 pivotally couples to the slide rail assembly 41 at rear pivot point, or rear slot 53. The rear suspension arm has a lower cross-member 70 that pivots in the rear slot. A pivot locating plate 54 is removably mounted to the slide rail by bolts, clips or other fastening means. Interchangeable pivot locating plates position the lower cross-member at a forward, center or aft location in the slot. In one embodiment, slot 53 is about one inch wide, and lower cross-member 70 has an outer diameter of about 0.70 inches.

When the lower cross-member 70 is centered in the slot 53, the slide rail 41 is parallel to a reference plane on the snowmobile frame 21. When the lower cross-member is forward in the slot, as shown in FIG. 9, the front of the slide rail 41 is slightly lower than the rear of the slide rail so that the slide rail has a slight downward tilt. When the lower cross-member is aft in the slot, the front of the slide rail 41 is slightly higher than the rear of the slide rail so that the slide rail has a slight upward tilt.

Therefore, the weight supported by the slide rail 41 can be shifted from the front to the back of the slide rail by tilting the slide rail, because the section of the slide rail that is lowest supports more weight. When the weight is transferred to the back of the slide rail, more weight is carried by the front suspension and skis 27. Conversely, when the weight is transferred to the front of the slide rail, less weight is carried by the front suspension and skis. It is desirable to change the weight carried by the front suspension and skis to adjust to changing terrain conditions—more weight for icy conditions, and less weight for deep snow conditions.

Figure 13:
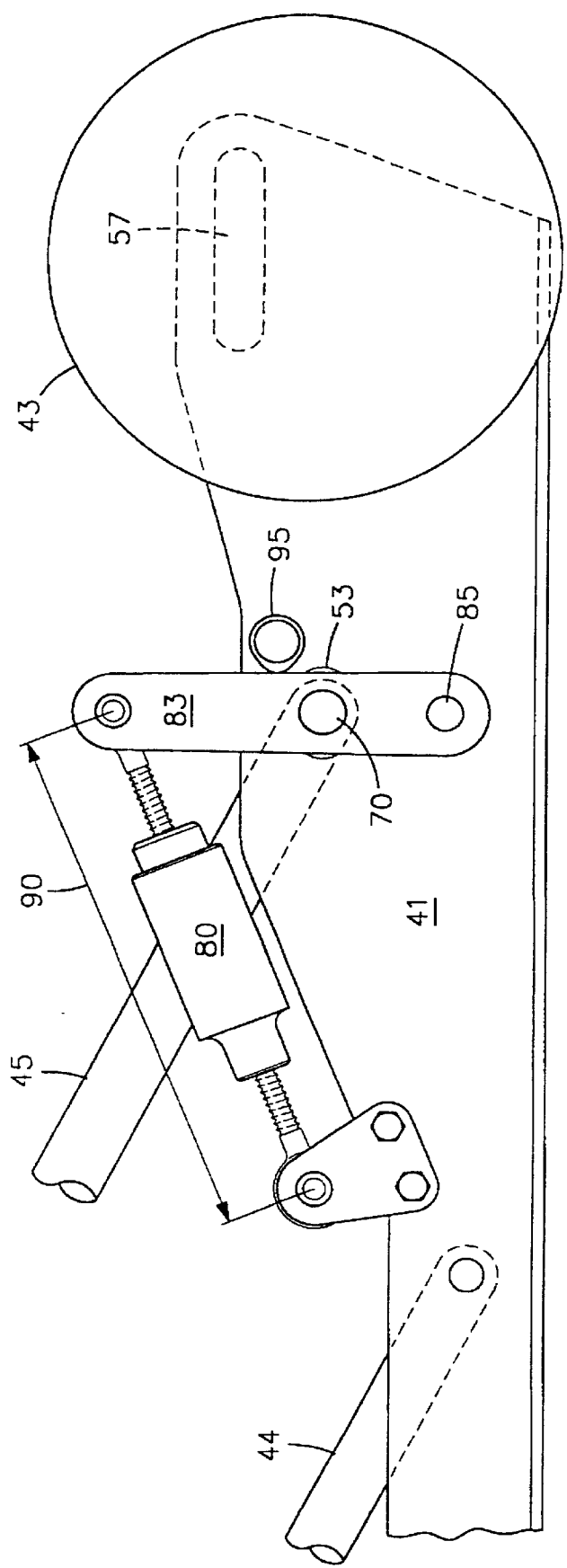
FIG. 13 is a side elevation view of a dashpot assembly and an adjustable stop incorporated into the rear suspension of the present invention.
Figure 14:
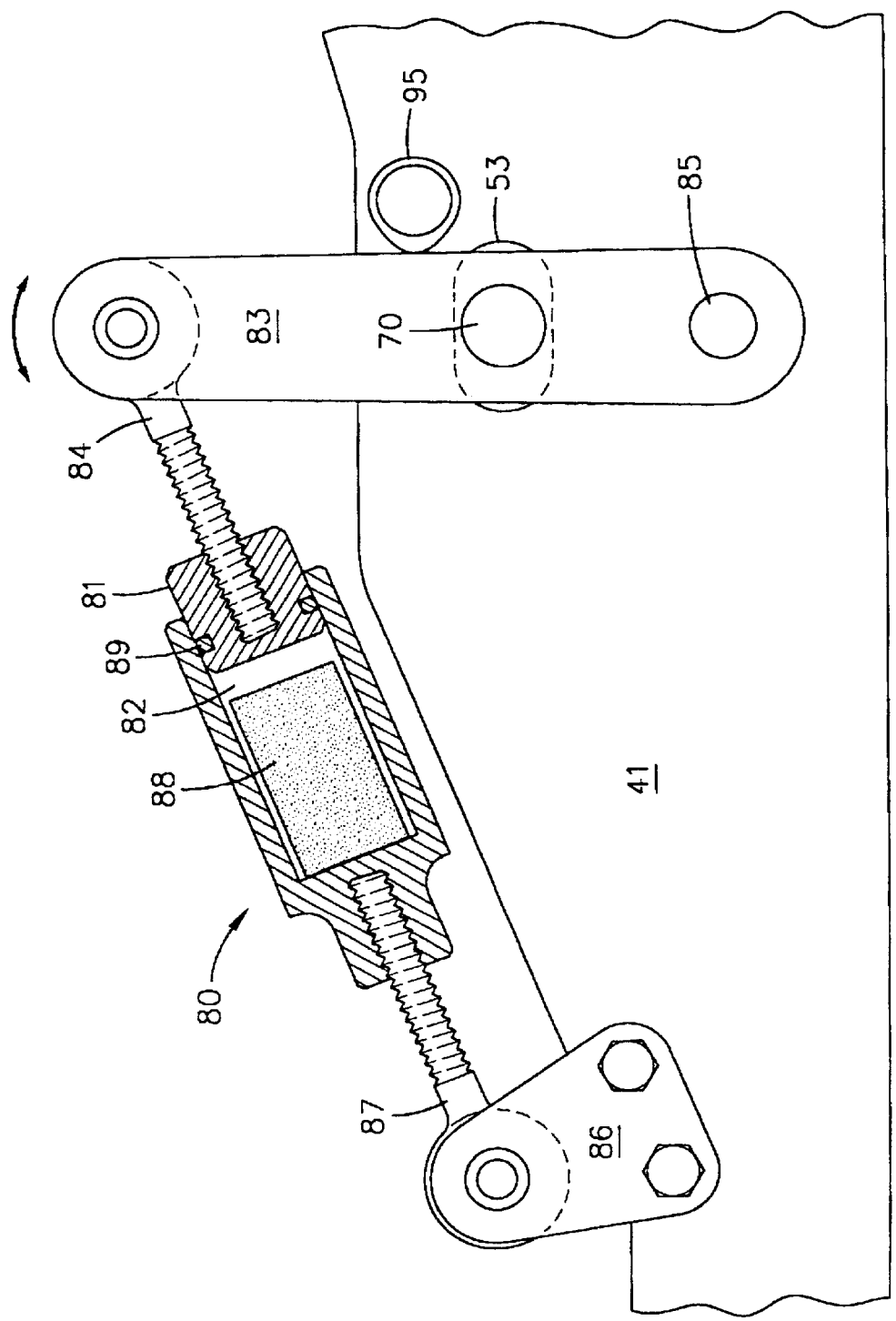
FIG. 14 is a cross-sectional view of the dashpot assembly of FIG. 13.

FIGS. 13 and 14 depict an alternative embodiment of the present invention that allows the lower cross-member 70 to move in rear slot 53. A dashpot assembly 80 comprises piston 81 slidably positioned within cylinder bore 82. In one embodiment, the piston has a sealing element, or O-ring 89 removably positioned about the perimeter of the piston. The piston is pivotably coupled to lever arm 83 by a threaded bearing 84. The lever arm is pivotably coupled to the slide rail 41 by a bushing or bearing 85. The lower cross-member 70 is also pivotally coupled to the lever arm by a bearing or bushing or other suitable means. Cylinder bore 82 is pivotably coupled to bracket 86 by a second threaded bearing 87. The bracket is either an integral member of slide rail 41, or is affixed to the slide rail by welding, fasteners or other suitable means.

In a preferred embodiment, the threaded bearings 84 and 87 are configured so that one bearing has a left-hand thread and the other bearing has a right-hand thread, that is, a turnbuckle arrangement. This allows dashpot length 90 to quickly, and easily changed. If the dashpot length is increased, lever arm 83 will be pushed towards the rear of the slide rail 41, thereby shifting the pivot point for lower cross-member 70 also towards the rear of the slide rail. By shifting the pivot point 53 toward the rear, the effective length of the rear suspension arm 45 is increased. Because the rear suspension arm 45 is now effectively longer than suspension arm 44, the slide rail 41 will have a slight upward tilt. Therefore, as discussed above, some snowmobile weight is transferred to the rear section of the slide rail.

In one embodiment, adjustable stop, or cam 95 can be used to decrease the effective length of rear suspension arm 45. Cam 95 is rotatably mounted in slide rail 45, adjacent to lever arm 83. The cam can be rotated so that it contacts the lever arm and forces the lever arm toward the front of the slide rail, thereby shifting the pivot point for lower cross-member 70 also towards the front of the slide rail. By shifting the pivot point 53 toward the front, the effective length of the rear suspension arm 45 is decreased. Because the rear suspension arm 45 is now effectively shorter than suspension arm 44, the slide rail 41 will have a slight downward tilt. Therefore, as discussed above, some snowmobile weight is transferred to the front section of the slide rail. In one embodiment, the cam can move lever arm 83 up to about 0.50 inches.

Referring to FIG. 14, moveably positioned within cylinder bore 82 is energy absorbing device 88. The energy absorbing device can be comprised of a urethane, rubber, plastic, metals, metal alloys or other suitable materials. In a preferred embodiment, a urethane spring comprising a polyether-elastomer, manufactured by Century Spring Corporation of Los Angeles, Calif. is employed. The elastomer can have a cylindrical shape, with one or more bores extending along a primary axis of the cylinder. Alternative elastomers can be formed into cones, eggs and other shapes designed to vary the amount of force required to compress the elastomer.

Alternatively, dashpot assembly 80 can be comprised of a small spring/damper unit, or it can be comprised of one or more elements designed to allow the lower cross-member 70 to shift relative to slide rails 41. For example, a system comprised of hydraulic or pneumatic elements could be employed, so that the amount of force required to shift pivot point 53 can be quickly adjusted. In one embodiment, this adjustment feature could be located within easy reach of the snowmobile operator. In a preferred embodiment, two dashpot assemblies 80 are employed, with one dashpot assembly located on each slide rail. Alternative embodiments would position one dashpot element, or a hydraulic element between the slide rails 41, that would be configured to control both slide rails.

Referring to FIGS. 7 and 9, a group of idler wheels 43 are rotatably mounted on an axle 56 that is positioned in a channel 57 at the aft end of each slide rail 41. These idler wheels can be adjusted in the forward and aft direction by conventional means, such as a threaded lock-nut (not shown), thereby permitting the removal, installation and adjustment of the track 23.

Referring to FIG. 5, an engine exhaust pipe 60 is connected to the engine 22, which can be either a 4-stroke or 2-stroke design. The exhaust pipe is routed underneath the seat 24, heating the seat as the hot exhaust gasses heat the exhaust pipe. The warm seat helps to keep the operators' lower extremities warm. Also, inadvertent contact with the hot exhaust pipe is greatly minimized by the under-seat routing. Preferably, a single exhaust pipe is routed under the seat, but in other embodiments, two or more exhaust pipes may be routed under the seat. Alternatively, the exhaust may terminate with a split tip (not shown) that splits a singe exhaust pipe into two separate exhaust pipes. In another embodiment, the tip of each exhaust pipe 60 of a multiple exhaust pipe under-seat routing may be split into two or more tips (not shown), forming a plurality of split tips.

Operation

Figure 10:
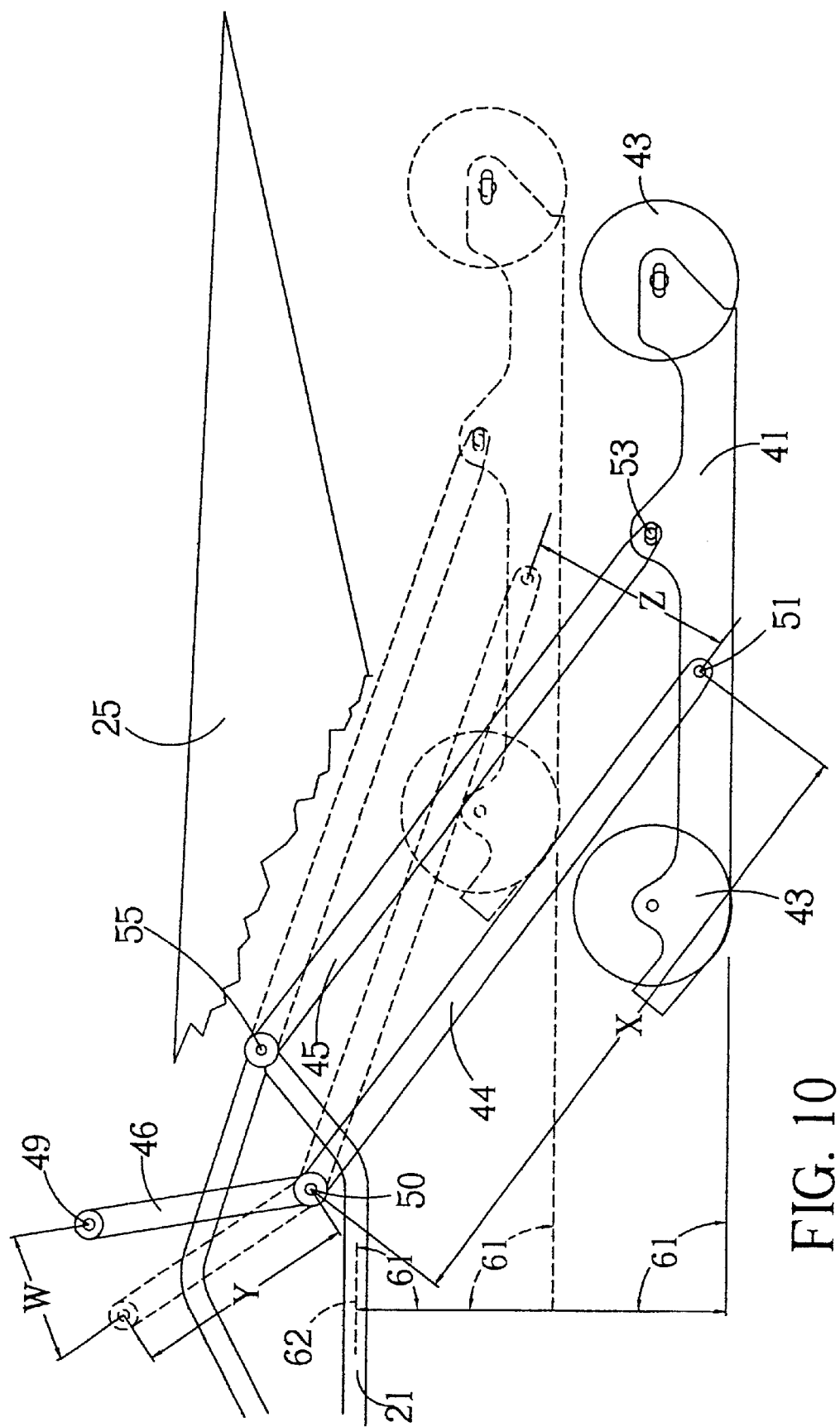
FIG. 10 is a side elevation view illustrating some of the characteristics of the rear suspension movement of the embodiment of FIG. 4.

Referring to FIG. 10, a portion or segment of the rear suspension travel or movement is illustrated. The front arm 44 has a length X, and the rocker arm 46 has a length Y, and both pivot about frame pivot point 50. In a preferred embodiment, the X-length is about 20 inches, and the Y-length is about 10 inches. Therefore, the front arm is about twice as long as the rocker arm, that is, the leverage ratio between the front arm and the rocker arm is 2:1 ("2 to 1"). Alternatively, the X- and Y-lengths could vary from a minimum leverage ratio of about 1.5:1 to a maximum leverage ratio of about 4:1. With a leverage ratio of 2:1, the distance Z that slide rail pivot point 51 travels is twice the distance W that upper rocker arm pivot point 49 travels.

One advantage of a leverage ratio between the front arm 44 and the rocker arm 46 is that a smaller, more compact damper 47 and coil spring 48 can be used. Because of the 2:1 leverage ratio, the suspension movement of the present invention can be twice the stroke length of the damper. Conversely, conventional suspensions locate the spring and damper units within the track, thus limiting suspension movement to the stroke length of the damper, or to about 10 inches.

The leverage ratio also contributes to the extremely large range of motion, or suspension travel of about 16 inches, which is significantly more than conventional snowmobile suspensions. For example, referring to FIG. 10, the suspension travel starts when the slide rail 41 is farthest from the tunnel 25, shown approximately in solid lines, and the suspension is completely extended. When the slide rail is closest or uppermost to the tunnel 24, and the suspension is totally compressed, or bottomed (not shown) the suspension travel is complete.

Conventional belts or tracks 23 are generally manufactured in two lengths: 121 and 136 inches. For a conventional suspension having only 10 inches of travel, the percentage of suspension travel to track length is only 8% (10 divided by 121) for a 121 inch track, and 7% (10 divided by 136) for a 136 inch track. The suspension travel of the present invention is about 16 inches. The percentage of suspension travel to track length is now 13% for 121 inch tracks, and 12% for 136 inch tracks. This is a 5% increase over conventional suspension systems.

The large, desirable arcs circumscribed by the front and rear arms, 44 and 45 respectively, are the result of unique "suspension geometry." Superior suspension geometry is achieved by very carefully arranging the lengths and pivot points of the suspension arms.

Referring to FIG. 10, one advantage of the suspension geometry of the present invention is that an angle of inclination, or orientation 61 is constant between the slide rail 41 and the frame 21 throughout the range of motion of the slide rails. As the slide rails move in suspension travel, their orientation with respect to any fixed arbitrary plane 62 that passes through the snowmobile frame remains constant. For example, if plane 62 is parallel to the sliders 42 on the bottom of the slide rail 41—when the slide rail is positioned closest to the tunnel 25—the arbitrary plane and the slide rail will still be parallel when the slide rail is positioned farthest from the tunnel 25. Thus, the angle of inclination, or orientation 61, between the slide rail and the frame remains constant throughout the range of motion of the suspension.

This suspension geometry is achieved because the front and rear arms, 44 and 45 respectively, are equal in length and parallel, and because in one embodiment of the invention, both arms have a fixed, or substantially constant length, thereby achieving constant orientation slide rail movement. Because the slide rails remain in a constant orientation, weight transfer is substantially eliminated. As discussed above, weight transfer affects the amount of weight carried by the steering skis 27, and reducing weight transfer minimizes changes in the overall snowmobile handling characteristics.

However, in some instances, a small amount of angular divergence between the slide rails 41 and the fixed arbitrary plane 62 can be desirable. That is, in an alternative embodiment of the present invention, the angle of inclination 61 between the slide rails and the frame will not remain constant throughout the range of motion of the suspension. It has been determined that a small amount of "play" in the suspension increases driving comfort and operator safety. When the snowmobile encounters small bumps or irregularities in the terrain, the entire suspension assembly is shifted upward, as shown in FIG. 10. However, if the forward section of the slide rails 41 are allowed to deflect upward when encountering small bumps, overall suspension movement or deflection is decreased, thereby improving driving comfort. The small slide rail deflection is achieved by incorporating one or more dashpot assemblies, or damper elements 80, shown in FIGS. 13 and 14, into the suspension of the present invention. The lower cross-member 70 shifts in slot 53 as the slide rails 41 encounter small bumps. The lower cross-member pivots the lever arm 83, forcing piston 81 into cylinder bore 82 and against energy absorbing device 88. In a preferred embodiment the total movement of piston 81 will range between about $\frac{1}{16}$ of an inch to about $\frac{1}{2}$ of an inch. This will allow the forward section of the slide rails to deflect in a range between about 6 inches an upward direction and, if necessary, about 3 inches in a downward direction. In this manner, small bumps are absorbed by the forward section of the slide rails and driving comfort is improved. Cam, or adjustable stop 95 can be configured to limit the amount of movement of lever arm 83, thereby limiting the movement of lower cross-member 70, which limits the deflection of slide rails 41. Therefore, the amount of slide rail deflection is completely adjustable.

Figure 11:
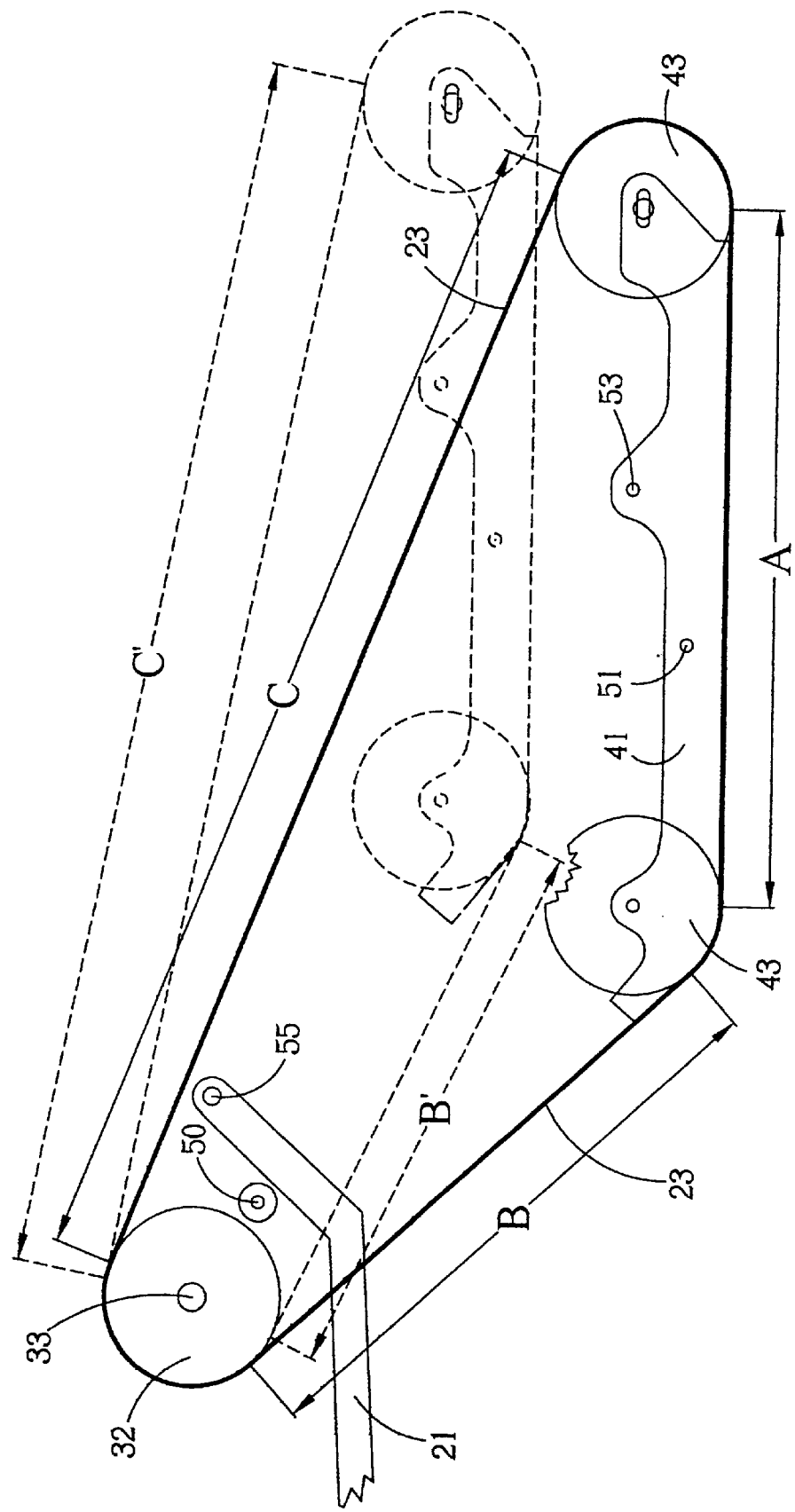
FIG. 11 is a side elevation view illustrating additional characteristics of the rear suspension movement of the embodiment of FIG. 4.

Another important feature of the suspension geometry of the present invention is that the frame pivot points 50 and 55 for the front and rear arms, 44 and 45, respectively, are located at the front area of the tunnel 25, near the track sprocket 32. This has several advantages. As shown in FIG. 11, the track sprocket 32 location is constant as the suspension and track 23 move in their range of motion. Therefore, pivot points located inside the track perimeter, but near the track sprocket will not interfere with or contact the track as it moves with the suspension. A "no-track-interference zone" can be determined by moving the suspension throughout its range of motion and identifying the path of the track. Depending on the suspension geometry, and the suspension travel, the no-track-interference zone can extend up to about three track sprocket 32 diameters from the track sprocket rotational axis 33.

Another advantage of having the frame pivot points 50 and 55, respectively, located at the front area of the tunnel 25 is that the front and rear arms, 44 and 45, respectively, are positioned at an angle with respect to the slide rail 41, allowing long suspension arms that move in arcs having a long radius. Also, the beneficial leverage ratio of about 2:1, described above, can be achieved with long arms. Furthermore, in a preferred embodiment, the idler wheels 43 in the tunnel 25 can be eliminated, allowing the triangular track 23 configuration. This removes the long fixed length of track between the track sprockets and upper idler wheels of conventional suspensions, shown in FIG. 3 as upper track routing 8. One embodiment of the present invention eliminates the fixed length upper track routing, and uses the track 23 length gained thereby for increasing suspension travel. Alternatively, one or more idler wheels 43 could be located near the track sprockets 32, thereby decreasing the fixed length of track between the track sprockets and idler wheels to about one-half of the slide rail track length A, shown in FIG. 11.

In addition, careful location of the frame pivot points 50 and 55 in the area around the track sprocket 32, minimizes any slack or tension developed in the track 23 during suspension movement. Conventional snowmobile suspension systems have an extended forward section on their long slide rails to absorb track slack generated during suspension movement. In the present invention, as the slide rail moves, the lengths of the sides of the suspension triangle change. As a result, the lengths of the track 23 routed about the suspension triangle change—but the sum of the lengths of the suspension triangle remains substantially the same, thereby minimizing any slack.

For example, as shown in FIG. 11, the length A of track 23 against the slide rail 41 remains generally constant because the length of the slide rail does not change. When the suspension is completely extended, length B is about 23 inches, and length C is about 48 inches. When the suspension is completely compressed, or bottomed, length B' is about 22 inches, and length C' is about 49 inches. Thus, length B becomes a slightly shorter B' and length C becomes a slightly longer C' as the slide rail 41 moves upwards towards the tunnel 25. The present invention minimizes track slack by carefully locating the frame pivot points, 50 and 55 respectively, for the front and rear arms, 44 and 45 respectively, in the area around the track sprocket 32. In a preferred embodiment, the distance from the track sprocket rotational axis 33 to the front arm pivot point 50 is about 5 inches, and the distance from the track sprocket rotational axis to the rear arm pivot point 55 is about 10 inches. Alternative embodiments could position the front and rear arm pivots within about 20 inches of the track sprocket rotational axis and achieve similar results.

Figure 12:
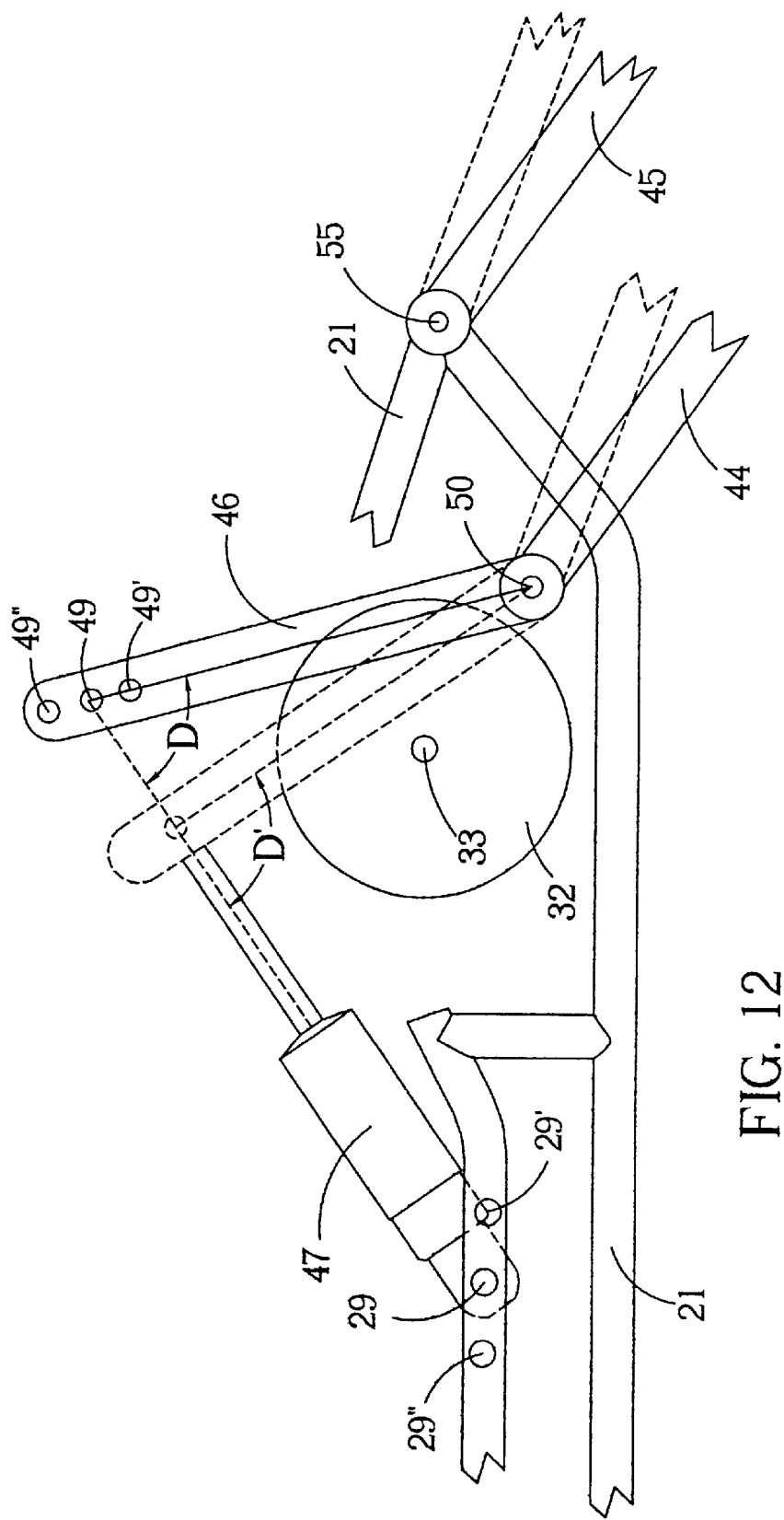
FIG. 12 is a side elevation view of the rocker arm and damper relationship of the rear suspension of the present invention.

The rising-rate arrangement of the present invention will now be explained with reference to a preferred embodiment shown in FIG. 12. Rocker arm 46 is fixed relative to front suspension arm 44, and both components pivot about frame pivot point 50 as the snowmobile encounters bumps. Damper 47 is pivotally connected to the rocker arm at the upper rocker arm pivot point 49 and to the frame 21 at the damper pivot point 29. In this preferred embodiment, a coil spring 48 is mounted coaxially about the damper, as shown in FIG. 7. When the snowmobile encounters a bump, the front suspension arm and the rocker arm both pivot about frame pivot point 50. As the rocker arm pivots, the damper is compressed. As the damper is compressed, the angle D, which is less than 90 degrees, becomes larger and reaches 90 degrees at D' when the suspension is completely compressed or bottomed. Therefore, the rate of compression of the damper increases and the damper efficiency or resistance also increases. Thus the resistance to compression becomes progressively greater as the suspension travels toward the completely compressed position.

An advantage of the present invention is that the characteristics of the rising-rate can be quickly changed or adjusted to suit different operating conditions. When traversing extremely bumpy terrain, a more progressive rising-rate is desired, and can be quickly achieved by moving the damper pivot point 29 to pivot point 29'. The angle D is significantly smaller when the damper is mounted at pivot point 29', thus the rate of damper resistance is even more progressive. Conversely, when the damper is mounted at pivot point 29", the angle D is larger than 90 degrees, and the damper becomes less effective as the suspension is compressed. This is a 'falling-rate' configuration, suitable for terrain with very small bumps.

Again referring to FIG. 12, another advantage of the present invention is that the leverage ratio, discussed above, can be quickly changed or adjusted by pivotally attaching the damper 47 to upper rocker arm pivot points 49' or 49". Operators may desire different leverage ratios when carrying different loads on the snowmobile. Increasing the leverage ratio decreases the amount of force at the end of the suspension arms 44 or 45 to compress the damper. When the damper is mounted at pivot point 49', the effective length of the rocker arm 46 is now shorter as the damper is attached closer to the frame pivot point 50. This changes the leverage ratio to as much as 4:1. Alternatively, the leverage ratio can be decreased by attaching the damper to pivot point 49", which lengthens the effective length of the rocker arm, decreasing the leverage ratio to about 1.5:1.

Alternatively, a bell crank (not shown) is pivotally connected to the rocker arm 46, frame 21 and a suspension arm. When the suspension arm pivots, the rocker arm pivots about the frame pivot point, actuating the rocker arm, that compresses or expands the damper 47.

Other embodiments

Certain preferred embodiments have been described above. It is to be understood that a latitude of modification and substitution is intended in the foregoing disclosure, and that these modifications and substitutions are within the literal scope—or are equivalent to—the claims that follow.

Accordingly, it is appropriate that the following claims be construed broadly and in a manner consistent with the spirit and scope of the invention herein described.

What is claimed is:

1. A snowmobile suspension, comprising:
   at least one guide rail;
   at least one lever arm pivotably coupled to the guide rail;
   a substantially constant length member pivotally connected to the lever arm and to the guide rail about a single pivot axis, the pivot axis configured to have a plurality of pivot axis positions; and
   at least one damping assembly coupled to the guide rail and to the lever arm, the damping assembly configured to restrict a movement of the pivot axis as the pivot axis moves from each of the plurality of pivot axis positions.

2. The snowmobile suspension of claim 1, wherein the damping assembly is selected from a group consisting of: dampers; springs; dashpots; pneumatic devices and hydraulic devices.

3. The snowmobile suspension of claim 1, further including:
   a lever arm pivotally coupled to the guide rail, the damping assembly, and to the substantially constant length member; and
   wherein the lever arm defines a leverage ratio between the damping assembly and the substantially constant length member.

4. The snowmobile suspension of claim 3, further including:
   a stop positioned adjacent to the lever arm, the stop configured to limit a travel of the lever arm.

5. The snowmobile suspension of claim 4, wherein a position of the stop is adjustable, so that a range of the travel of the lever arm is adjustable.

6. The snowmobile suspension of claim 4, wherein the stop is selected from a group consisting of: cams; adjustable stops; hydraulic devices and pneumatic devices.

7. The snowmobile suspension of claim 1, wherein the damping assembly comprises:
   a piston receiver;
   a piston slidably engaged in the piston receiver; and
   a damping element located in the piston receiver, the damping element configured to dampen a movement of the piston in the piston receiver.

8. The snowmobile suspension of claim 7, wherein the damping element is selected from a group consisting of: rubbers; plastics; urethanes; elastomers; metals and metal and alloys.

* * * * *